H. HERMANI AND J. S. D. AULD.
APPARATUS FOR ASSEMBLING FORMED BLANKS.
APPLICATION FILED OCT. 23, 1917.
1,331,503.   Patented Feb. 24, 1920.
7 SHEETS—SHEET 5.
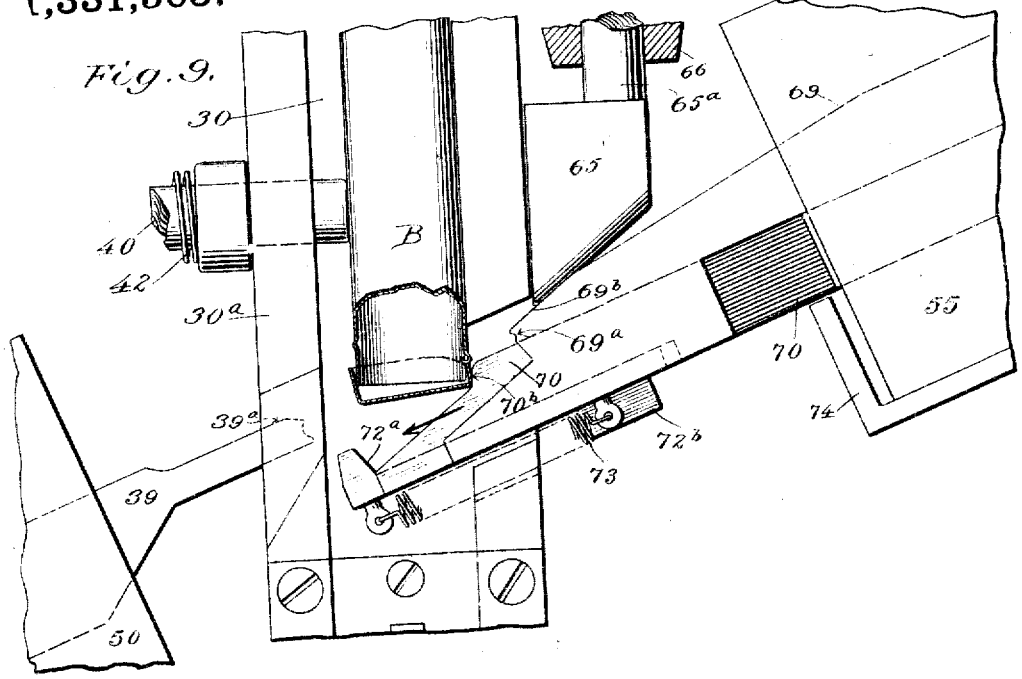
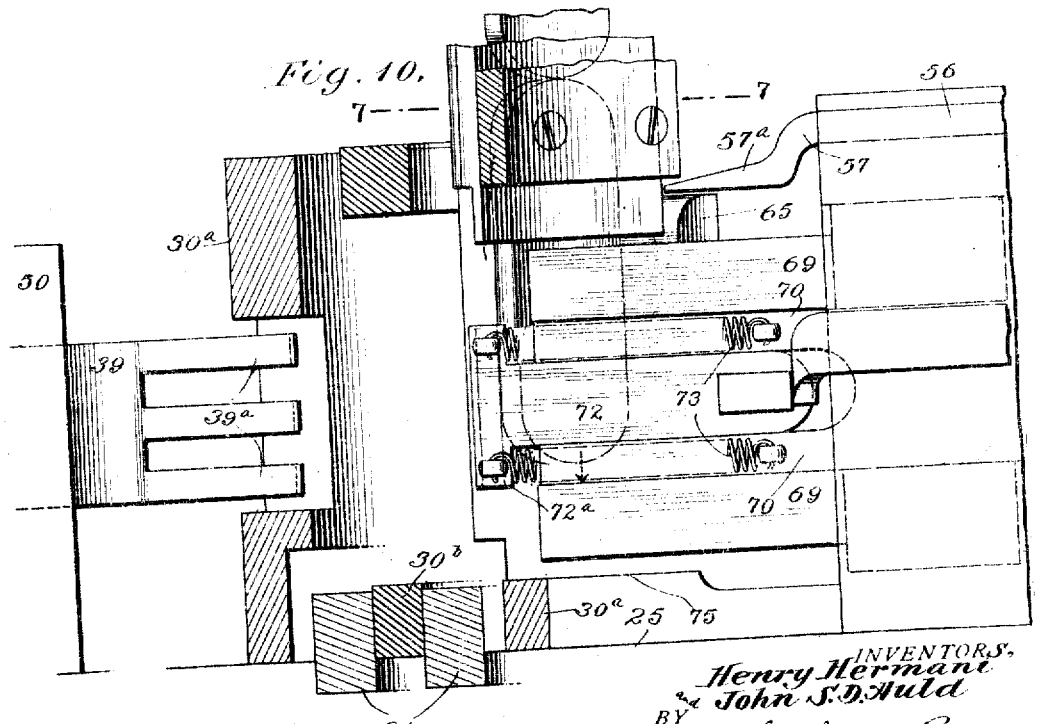
INVENTORS,
Henry Hermani
John S. D. Auld
BY
Meyers, Cushman & Rea
ATTORNEYS.

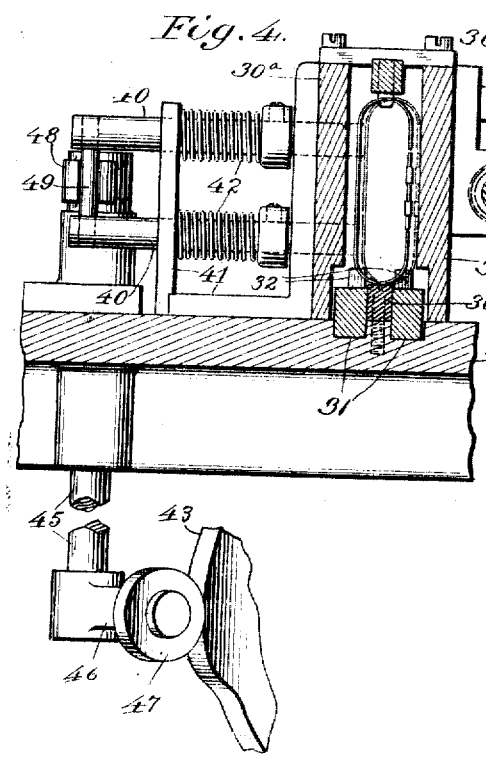
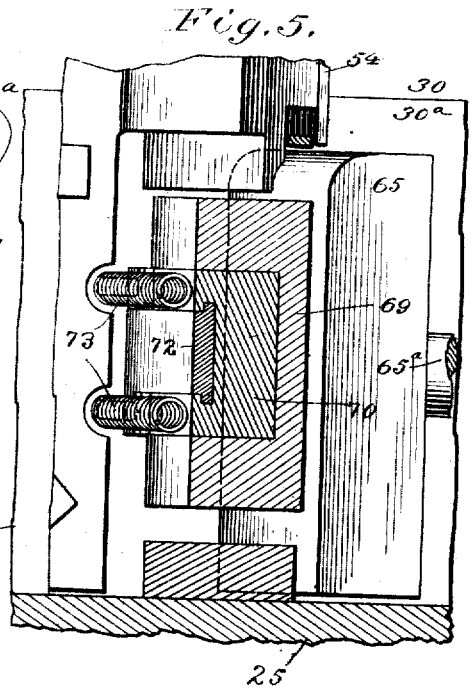
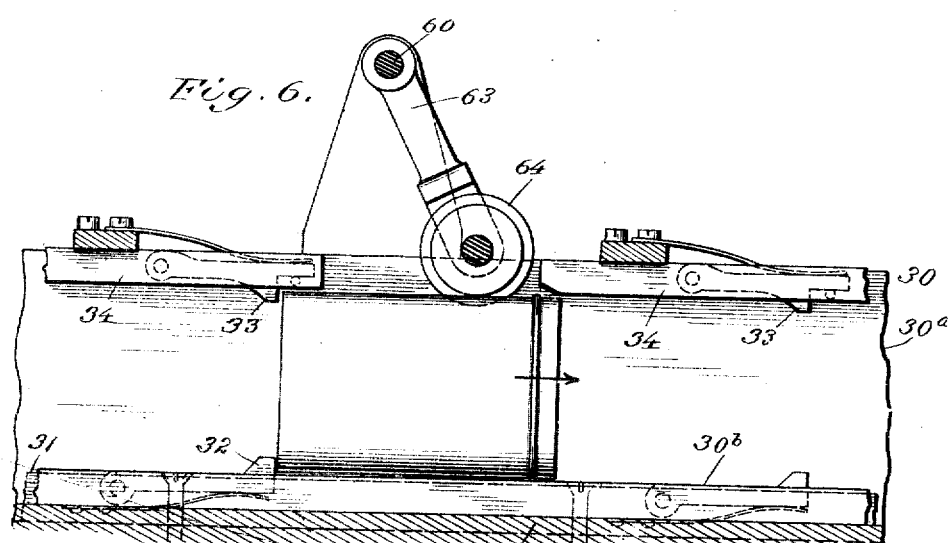

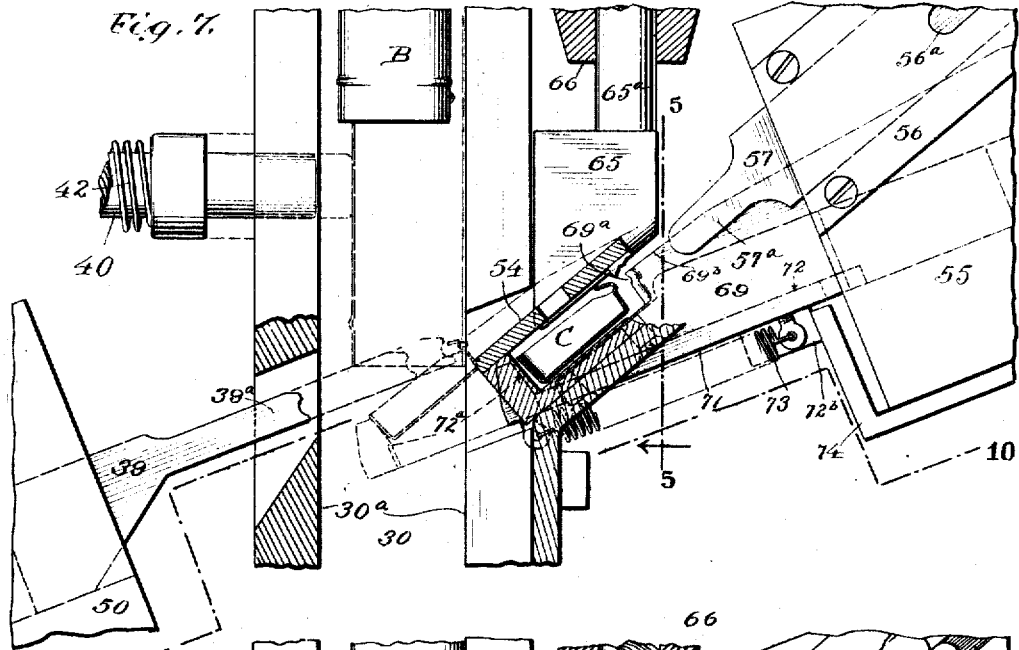
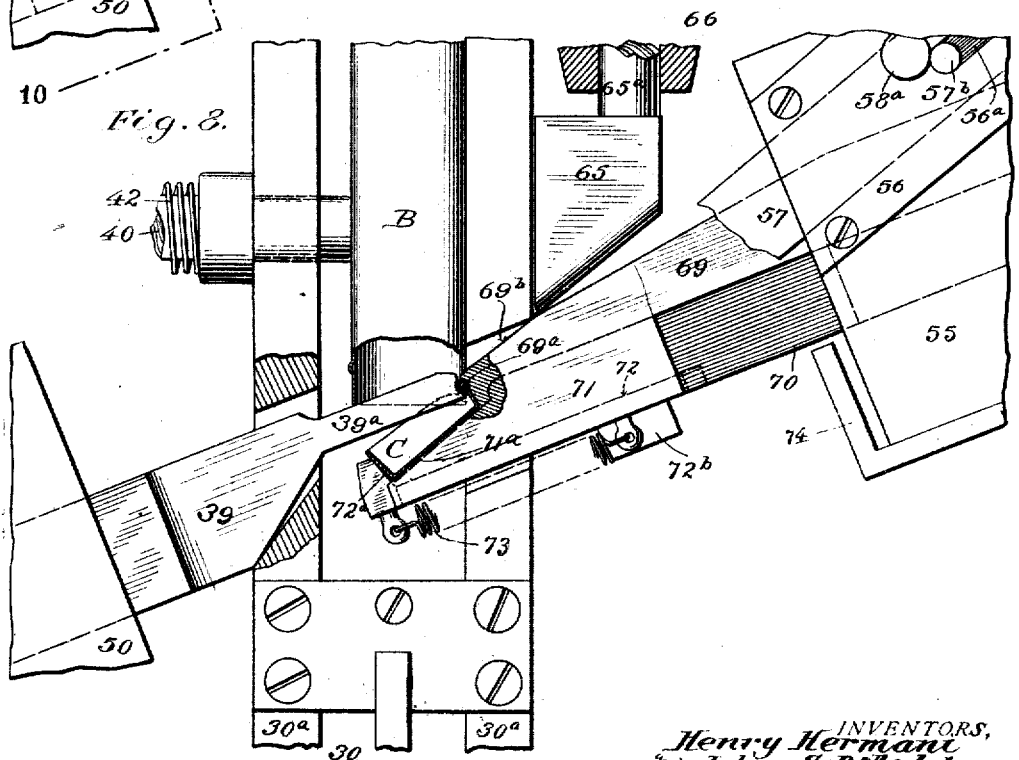

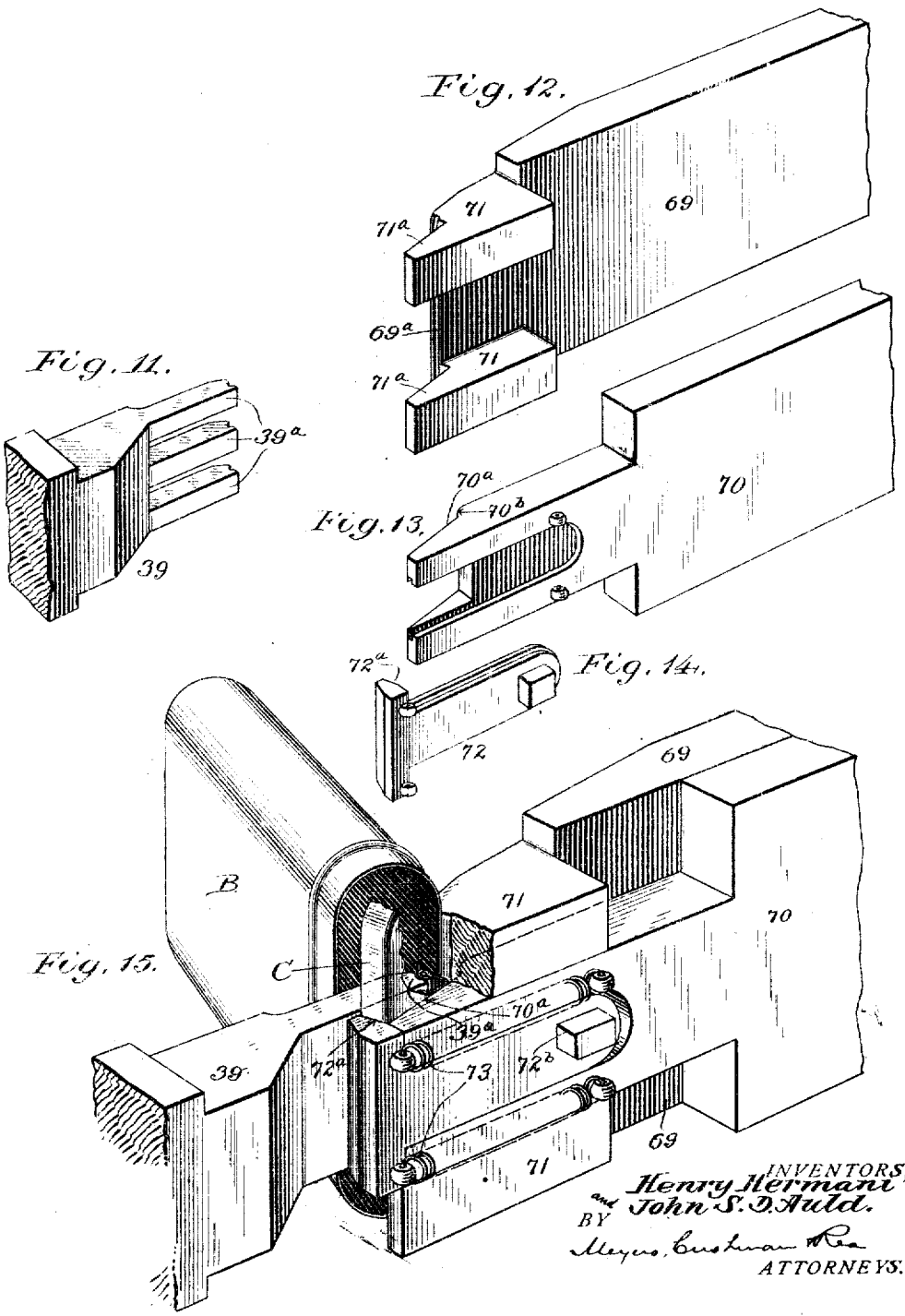

H. HERMANI AND J. S. D. AULD.
APPARATUS FOR ASSEMBLING FORMED BLANKS.
APPLICATION FILED OCT. 23, 1917.
1,331,503.
Patented Feb. 24, 1920.
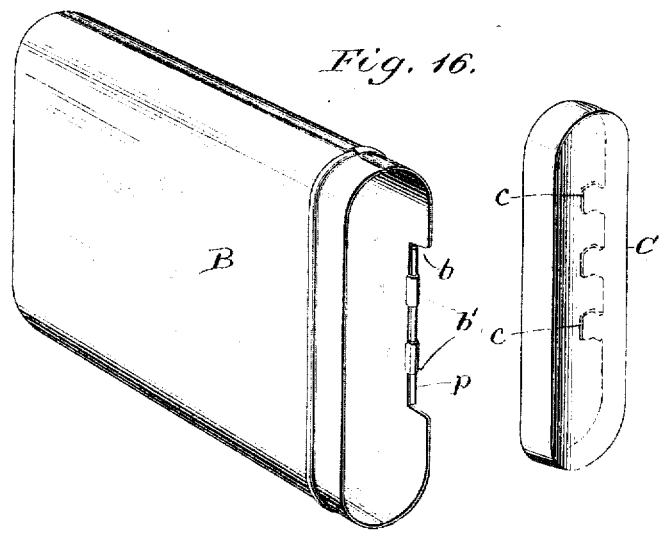
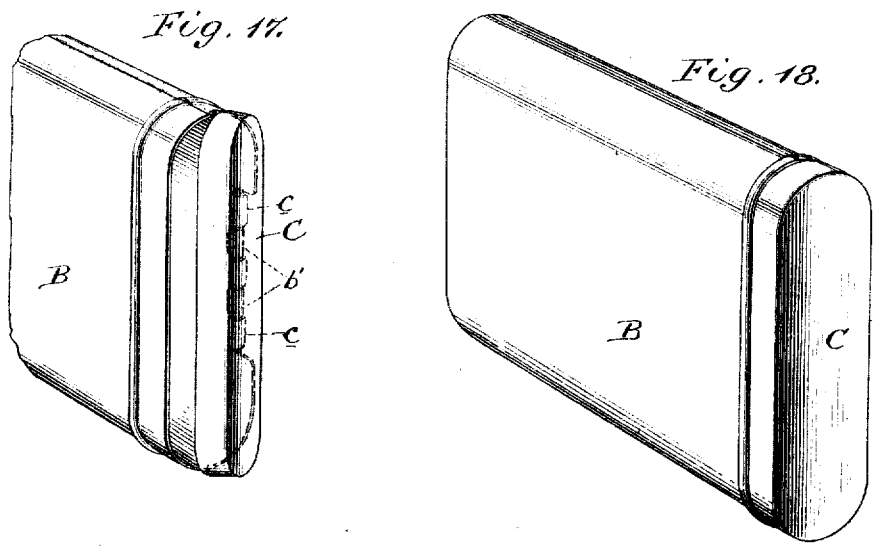

UNITED STATES PATENT OFFICE.

HENRY HERMANI, OF BALTIMORE, AND JOHN S. D. AULD, OF HIGHLANDTOWN, MARYLAND, ASSIGNORS TO TIN DECORATING COMPANY, OF BALTIMORE, MARYLAND, A CORPORATION OF MARYLAND.

APPARATUS FOR ASSEMBLING FORMED BLANKS.

1,331,503.

Specification of Letters Patent. Patented Feb. 24, 1920.

Application filed October 23, 1917. Serial No. 198,116.

*To all whom it may concern:*

Be it known that we, HENRY HERMANI and JOHN S. D. AULD, both citizens of the United States, residing at Baltimore and Highlandtown, in the county of Baltimore and State of Maryland, have invented new and useful Improvements in Apparatus for Assembling Formed Blanks, of which the following is a specification.
This invention relates to improvements in apparatus for assembling formed or shaped members or parts of metallic containers, such for instance as cans, boxes and the like, pertaining more particularly to apparatus for assembling the body and lid or cover and in which the cover is hinged to the body portion, each member carrying elements of the hinge.

While the present invention is adapted to operate in connection with containers of various forms, the embodiment of apparatus disclosed herein as exemplifying the general invention, is designed more particularly for the assembling of containers in which the bodies are more or less oval in cross-sectional contour—having parallel flat sides with rounded ends—the cover and body portion being hingedly connected on one of the longer sides of the container member. The members are generally formed separately and the shaped parts are then brought together and assembled. This general type of container is commonly employed in connection with the packaging of tobacco products.
To provide the assembly the body portion is generally formed with spaced ears through which a pintle extends on a line parallel to and spaced from the end of the body portion, the cover having a plurality of embryo ears in the form of hooks which are adapted to extend into the spaces between the ears of the body portion and be hooked and clenched about the pintle. Owing to the fact that the hinge connection is actually spaced from the end of the body portion—the flanges of the cover being adapted to overlap substantially the entire end of the body—assembly is more or less difficult, especially where it is to be provided automatically, this being due to the fact that the members must be brought together with accuracy and in definite relation, the hooks entered and the clenching tool brought into action to clench the hooks on the inside of the body portion. This necessitates assembly with the cover in an open or partially open position and movement of the members to proper position and in which position they are maintained during the several operations, a general cycle which must be provided in a simple and efficient manner.

Where the apparatus is to provide for large capacity operations these factors are of material importance, since the time during which operation may be had is of minimum length, and practical assurance must be had that the assembling action is properly had.

The present invention is designed to meet the various problems present in producing these results including that of large capacity, being especially adapted for use as an auxiliary to a body forming machine although not limited in that respect. To indicate the capacity, it may be noted that the present apparatus is designed to take care of the product of a machine for forming the bodies—without bottoms—the present apparatus working in synchronous step with such machine, presenting a cover, assembling the cover and body portion, clenching the hooks, closing the cover and advancing the completed assembly during the period of formation of the body member on the forming machine. Furthermore, these several operations are performed at a single station, so that the entire manipulation required in producing the apparatus product takes place while the elements—the body portion and cover—are in this station, thus reducing the amount of accurate positioning necessary to that required in initially presenting the parts to the station. As a result, not only is large capacity provided, but the apparatus is of such general formation as to greatly simplify prior structures and render them less costly to manufacture as well as reducing the liability of damage to the apparatus, since the completion of the manipulation at a single station permits of the omission of a considerable number of operating parts which are essential in prior structures, and at the same time enables the structural parts employed to be greatly simplified and formed in such manner as to reduce the amount of wear to a minimum and hence reduce the cost of the up-keep of the apparatus. In addition, the apparatus is of a type embodying simple mechanisms and mechanical movements which are arrranged in such manner as to withstand the more or less rough usage inherent in apparatus of this type, thereby not only providing for simplicity in structure and efficiency in operation, but enabling low cost of manufacture and repair maintenance.

To these and other ends, therefore, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views:

Fig. 4 is a sectional view taken on line 4—4 of Fig. 1.

Fig. 5 is a sectional view taken on line 5—5 of Fig. 7.

Fig. 6 is a sectional view taken on line 6—6 of Fig. 1.

Fig. 7 is a detail plan view, partly in section, showing, in full lines, the position of parts prior to the actual assembly, and showing, in dotted lines, the changed position of the various parts in partially assembling the members, the view being taken on line 7—7 of Fig. 10.

Fig. 8 is a similar view showing the clenching operation.

Fig. 9 is a similar view showing the cover-closing operation.

Fig. 10 is a sectional view taken on line 10—10 of Fig. 7.

Fig. 11 is a perspective detail of a portion of the clencher member.

Fig. 12 is a perspective view of a portion of the lid carrier.

Fig. 13 is a perspective view of a portion of the lid closer.

Fig. 14 is a perspective view of a cover clamping member.

Fig. 15 is a perspective view of the operating parts at the time of clenching the hooks.

Fig. 16 is a perspective view showing the body and cover members separated.

Fig. 17 is a similar view of these parts at the completion of the clenching operation.

Fig. 18 is a similar view showing the members assembled with the cover closed.

Figure 1:
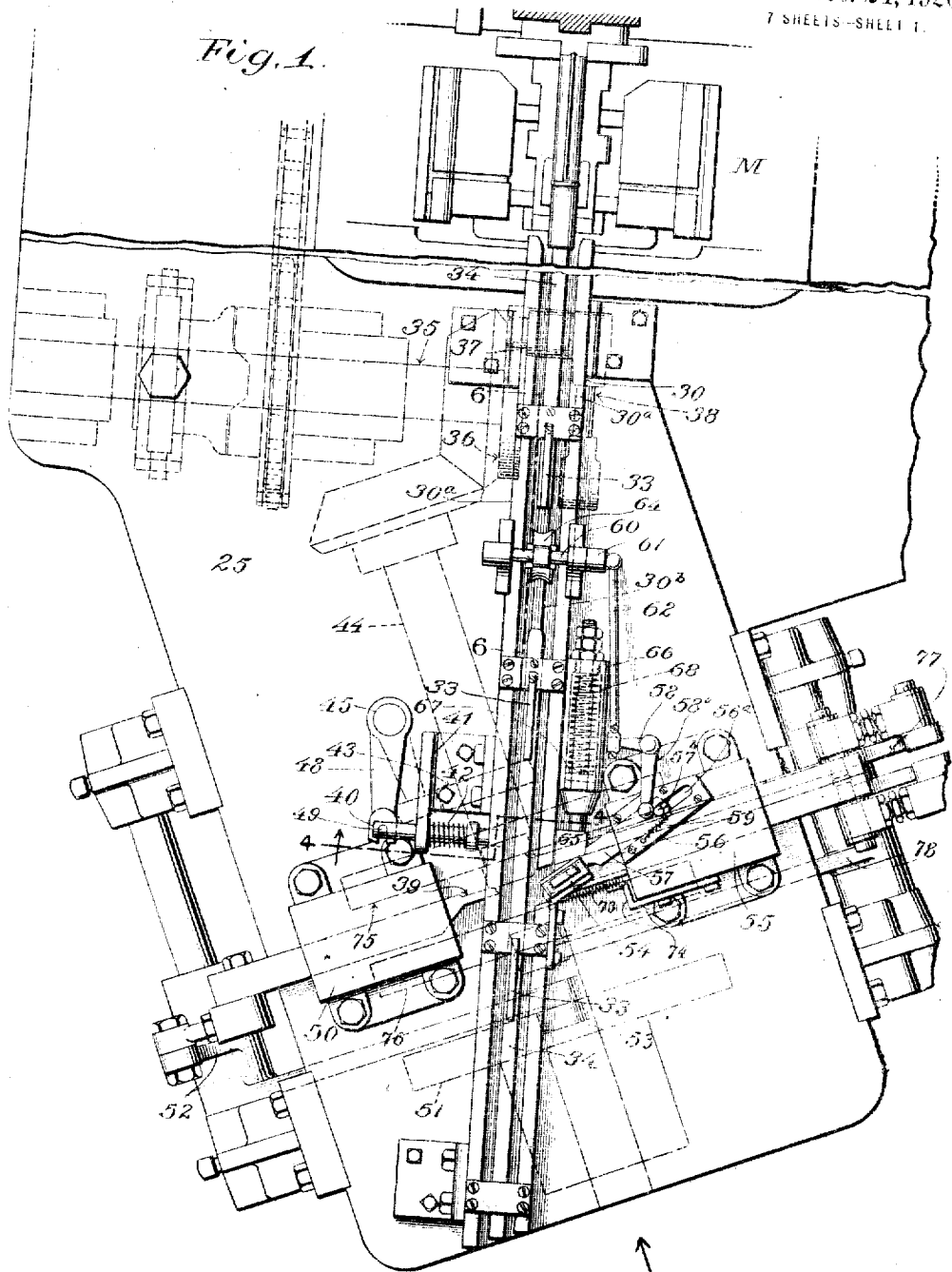
Figure 1 is a plan view of one form in which the present invention may be embodied, the invention being shown as an auxiliary or continuation to the body-blank forming mechanism.

For the purpose of illustrating the general principles of the present invention, we have shown an embodiment capable of and adapted to apply a shaped cover to the open end of the shaped body portion of a container, the shape referred to being indicated in Fig. 16, in which B indicates the body portion formed with parallel side walls and rounded ends, the cover being indicated at C and being adapted to extend over and overlap the walls of the open end of the body portion. The opposite end of the body portion may have a bottom secured thereto, although, in the disclosure shown in Fig. 1, the apparatus is designed to operate in connection with body portions onto which the bottom has not been applied at the time of the placing in position of the cover, the body portion forming machine, indicated at M in Fig. 1, being adapted to produce a blank of the desired contour and having its ends open, an arrangement which can be produced under large capacity conditions.

As shown, the body portion has one of its side walls cut-away as at $b$ and provided with spaced ears $b'$ through which extends a pintle $p$, this arrangement being provided in advance of delivery of the body blank—hereinafter referred to as a blank for purposes of explanation, the cover blank being indicated as a cover for similar reasons. The cover is provided with hook shaped ears $c$ spaced apart and arranged to be inserted beneath the exposed portions of the pintle, these hook ears then being clenched around the pintle. In the present invention, this hooking and clenching action is followed by closing the cover, but it is to be understood that this latter feature may be omitted, if desired where the exigencies of use are such as to make it desirable to deliver the assembled parts in unclosed condition. For the purposes of illustration, it is assumed that the operation includes the closing of the cover so as to produce a configuration approximately of the form shown in Fig. 18, Fig. 17 indicating the general positions and arrangement of parts on the completion of the clenching operation.

Before giving a detailed description of the structural elements of the apparatus, a brief description is given of the general operation in order that the detailed structural description may be better understood, the latter following, as far as possible, the travel of the parts through the apparatus.

The blanks B are delivered to a runway of the apparatus with the longer cross-sectional axis of the blank extending vertically, the pintle extending vertically at the advance end of the blank. The blanks are advanced over the runway by a step-by-step movement and may be delivered to the runway in any suitable manner, the drawings indicating this as taking place through the action of the discharging mechanism of the blank forming structure. It will be understood, of course, that this supply of the blanks to the runway may be provided manually.

The covers C are delivered to a cover hopper or chute by suitable means, which may be mechanical or manual in form, the covers also having their major axis extending vertically. The chute is arranged in such manner that a cross-section of the chute will have its length extending in a direction inclined to the direction of length of the runway, and it may be noted that this length of the chute is also inclined to the direction of advance movement of the cover. In actual fact, the chute is so arranged that the projecting hook ears c will, during the advance of the cover, freely enter the spaces beneath the pintle, and the hook ears are so shaped as to permit this positioning while the cover is partially open.

The body blanks are, through the action of the advancing means of the runway, brought to what may be considered as the hinging or manipulating station, the advance movement bringing a forward edge of the blank into proximity to or in contact with the clencher member which advances as the blank advances and which, at the time the blank reaches its proper position, extends across the path of travel of a wall of the blank, thus preventing advance of the blank beyond a predetermined point.

The cover blank carrier at the bottom of the chute is normally in such position that the cover is not clamped, the carrier, at this time, forming what may be considered a loose casing forming a variable channel into which the cover may freely enter from the chute. At a proper time, the walls of this cover casing are closed into position to clamp the cover and the latter is then advanced toward the positioned blank which, after having its advance movement stopped as indicated, is shifted into a clamped position.

The advance of the cover blank is so arranged that the hook ears or tongues will pass into proper position relative to the clamped blank B, and when the hooks are properly positioned, the clencher member is made active to curl the hook ends about the pintle, after which a lid closer element is brought into activity to move the secured cover to its closed position, the clencher member, which, during its cycle of operation, extends between the open end of the body blank and the cover, being withdrawn. After the cover has been closed, the closing mechanism is withdrawn to place it in normal position in the carrier to receive the succeeding cover blank, the body portion of the container—carrying the secured cover in its closed position—is unclamped, and the advancing mechanism advances the product out of the way of the succeeding blank.

In addition, the arrangement is such that a cover blank is not permitted to enter into its advancing carrier excepting in the presence of its corresponding body blank at the proper point in the advancing runway, thus permitting the mechanism instrumentalities to operate without damage in the absence of a body blank.

The entire assembly and closing manipulations are provided at the hinging or manipulating station, being completed within the time required by the advancing mechanism to return to its blank receiving position and then advance to position the blank into the manipulating station, these operations, where the apparatus is in synchronism with a blank forming machine, practically taking place in synchronism with the operation of said machine. In other words, the time of assembly and cover closing at the manipulating station does not exceed the time required in the formation of the blank.

30 indicates the advancing runway for the body blank. As shown in Fig. 4, this runway is in the form of a channel having opposing side walls 30$^a$ and a central bottom strip 30$^b$, these parts being suitably secured on the top of a table-like frame 25. As shown, the channel is of materially greater width than the width of the blank, thus permitting the blank to be freely advanced without liability of binding. Mounted on opposite sides of strip 30$^b$, are a pair of reciprocating bars or strips 31 each of which carry a plurality of spring supported pawls 32 (Fig. 6), these pawls being spaced apart in the direction of length of the bars at proper intervals. As seen, the advance end of pawls 32 is adapted to contact with the rear end of a blank and thus, during the advancing movement of bars 31 push the blank forward to advance it a distance substantially equal to the length of reciprocation of bars 31, the rear wall of each pawl being so arranged that during movement of bars 31 in the opposite direction this rear wall of the pawl will, through contact with the blank, cause the pawl to be depressed and thus permit it to pass beneath the blank to a point in rear thereof and in position to advance the succeeding blank when the direction of movement of the bars is changed.

These pawls 32 therefore act as advancing pawls for the blank. Coöperating with pawls 32, are a series of pawls or fingers 33 carried at suitable points on a strip or strips 34 mounted at the top of the container. For purposes presently described, this top strip is shown as formed in two parts separated from each other in the direction of length of the runway. Pawls or fingers 33 are also spring supported and are fixed as to position in the runway, these pawls or fingers acting as stops to prevent reverse movement of the blank when the advancing pawls are moving backward. The action of the two sets of pawls is such that pawls 32 carry the blank forward (depressing pawls 33 as the blank advances), locate the blank in advance of pawls 33, whereupon the advancing pawls change their direction of movement and move rearwardly without carrying the blank owing to the fact that the latter is held against retrograde movement by pawls 33.

Bars 31 are reciprocated by any suitable mechanism, that shown in the drawings being in the form of a rotating shaft 35, carrying a crank wheel 36 having a wrist pin 37 to which is connected a pitman 38, the latter being suitably connected to bars 31. Obviously, this is but one way in which the reciprocating motion of bars 31 may be obtained.

Shaft 35 forms the drive shaft for the apparatus and is driven from a suitable source, Fig. 1 showing this as a chain connection with a suitable mechanism of the body forming mechanism M, the apparatus, as heretofore indicated, being shown as a continuation of or an auxiliary to a forming mechanism of this type, runway 30 being shown as extending to a point where the blanks from the forming mechanism are delivered on to the runway where the advance is produced step-by-step by the action of pawls 32 and 33. As will be understood, the runway may have any desired length, the number of sets of pawls employed being dependent on such length. Similarly, the length of reciprocation of bars 31 will be arranged to meet the desired conditions, the arrangements, however, being such that the blanks will preferably be advanced in spaced apart relation and so arranged that the advance movement of the blank which is to be operated upon will leave it in position at the operating station.

During the advance of blank B to place the blank advance end at the proper point in the operating station, a clencher member or tool 39 is advanced, as presently described, into the path of travel of the blank, the tool thus forming a stop in the path of blank movement, the advancing mechanism bringing the blank into proximity to or in contact with this tool.

As heretofore pointed out, the blank advances along the channel substantially central of the channel, as shown in full lines in Fig. 4, after the blank has been advanced into proper position relative to the clencher tool (or into contact with any other suitable stop mechanism for limiting the advance movement of the blank), the blank is shifted laterally into contact with one of the side walls 30ª of the channel as shown in dotted lines in Fig. 4, this shifting movement being provided by a shifting member shown as in the form of a pair of pins 40 extending transverse to the channel and adapted to extend through suitable openings in the opposite side wall 30ª of the channel, these pins being supported in a suitable frame 41 and adapted to be reciprocated through the combined action of springs 42 and a cam 43, the cam being mounted on a shaft 44 having a gear connection with shaft 35, and being adapted to control the movements of a vertical shaft 45, the lower end of which carries an arm 46 on which is mounted a roller 47 adapted to contact with the operating edge of cam 43, the upper end of shaft 45 having an arm 48 coöperating with a pin 49 which connects pins 40, this being a simple arrangement of a cam-controlling mechanism for controlling the operations of the pins. Obviously, this mechanism may be modified or substituted by other types of mechanism if desired. The advancing movements of pins 40 are provided by springs 42 which, whenever the cam configuration permits, will cause the pins to advance and shift the blank to the dotted line position in Fig. 4, it being readily understood that the arrangement is such that no undue pressure will be applied to the blank, the pressure application being yieldable but having sufficient power to carry the blank into its shifted position and maintain it in such position during the subsequent operations. The pins are retracted by the action of the cam, thus compressing the springs which tend to maintain the roller 47 in contact with the face of the cam without, however, providing a pressure action on the blank such as would be provided by a positive cam action.

As shown in Fig. 1, shaft 44 extends in a direction inclined to the direction of length of the runway, and this shaft forms the drive shaft for the parts operative in the operating or manipulating station. The instrumentalities operative in this station have elements which reciprocate during the manipulating operations, and these elements generally reciprocate at an angle inclined to the longitudinal and transverse directions of the runway, the movements of these elements being in planes which are transverse to the direction of length of shaft 44. For instance, the clencher tool 39 extends through a housing 50 and operates through an opening formed in a side wall 30ª, the direction of length of the tool forming an obtuse angle with the direction of length of the runway in the direction of advance of the blank, while the advancing elements for the cover have their general directions of length extending on the lines of an acute angle with respect to the runway length, being located to operate through an opening formed in the opposite side wall of the runway.

Figure 2:
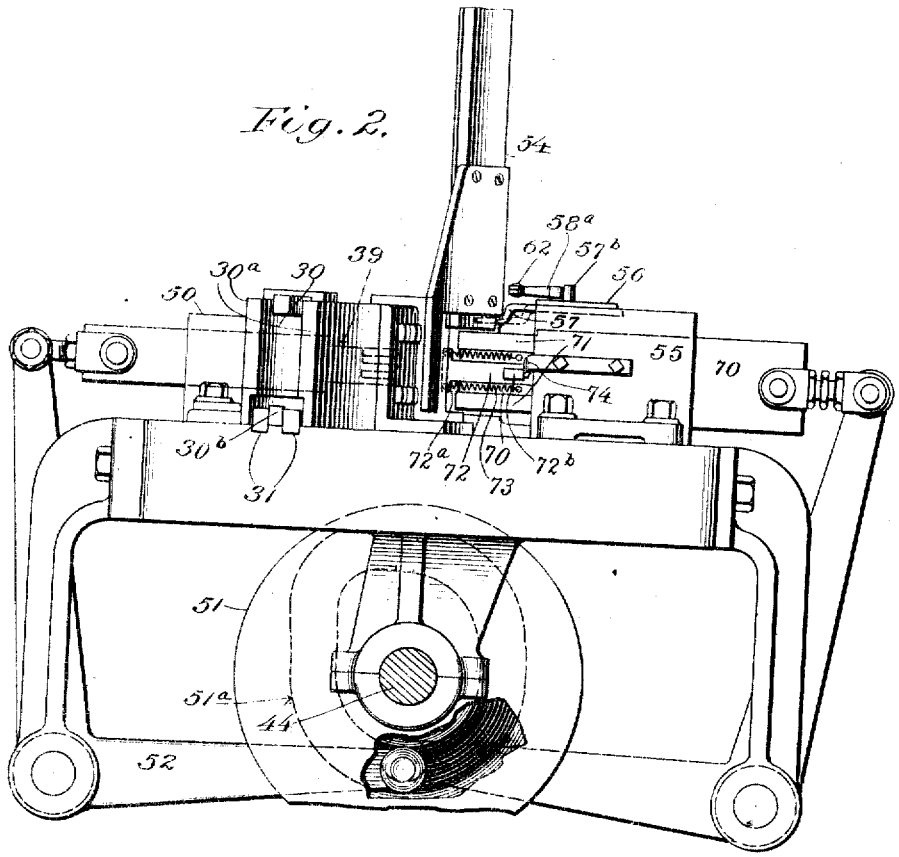
Fig. 2 is a front elevation of the same with parts broken away.

The operations of clencher tool 39 are controlled by a cam 51 (Fig. 2) through a pivoted bell crank lever connection 52, one arm of which carries a roller operative in the groove 51a of the cam, the other arm being adjustably connected to the shank of the tool beyond housing 50, cam 51 being mounted on shaft 44. As will be noted, the cam preferably provides a dwell to the tool during inward travel of the latter, this dwell taking place at the time of possible contact of the approaching body blank with the tool, the timing arrangement being preferably such that the body blank advancing instrumentality delivers the blank into contact while the clencher tool is at rest.

The advance end of the clencher tool is preferably in the form of fingers 39a, the advance face of each finger having a configuration adapted to provide the clenching action on one of the hook ears of the cover blank when brought into contact therewith during the assembling operation.

54 designates a chute through which the cover blanks are delivered to the operating mechanisms, this chute receiving the covers from a suitable source and in suitable manner and having a configuration adapted to permit free downward travel of a cover blank with its major axis extending vertically. The chute is supported in suitable manner and has its lower end preferably positioned above (Fig. 5) a clamping and advancing instrumentality into which a cover blank drops and which is presently described in detail.

The discharge of cover blanks from the chute is preferably controlled in order that a cover blank may not be delivered into its advancing instrumentality in the absence of a corresponding body blank to receive it, this control being provided in order to prevent damage to cover blanks—the general structure being such that any cover blank which may be advanced will be subjected to the regular operations of the clencher tool. Where no cover blank is present in the cover blank advancing instrumentalities, the instrumentality cycle of movements can take place without damage to operating parts. This control is provided by the following mechanism.

Mounted on a housing 55—through which elements of the clamping and advancing instrumentality operate as presently explained—is a supplemental housing 56 (Fig. 1) in which is mounted a slidable member 57, the advance end of which is in the form of a finger 57a (Figs. 1, 7 and 10), this finger being adapted to enter into chute 54 and operate in the nature of an escapement mechanism for the cover blanks. Member 57 is adapted to be reciprocated, any suitable mechanism being usable for this purpose. However, I have shown this member as provided with a pin 57b extending into an elongated slot 56a in housing 56, this pin projecting above the top plane of the housing and being adapted to be actuated by an arm 58a of a bell crank lever 58 mounted on a vertical axis, this form of connection being employed by reason of the direction of reciprocation of member 57, the arrangement forming a loose connection by means of which member 57 can be positively withdrawn from its position within the chute by the movement of the bell crank lever. The movement of member 57 in the opposite direction may be provided in any suitable manner as by a spring 59.

Bell crank lever 58 is operated by the movements of a rock shaft 60 mounted in bearings carried by the runway and located above the runway at a point where a body blank to be introduced into a manipulating station is required to pass. Shaft 60 carries a crank arm 61 which is connected to the other arm of bell crank lever 58 by connecting rod 62, this arrangement causing rocking movement of shaft 60 in one direction to move lever 58 to provide movement of member 57 in one direction, the return movement of shaft 60 permitting spring 5 to become active to return member 57 to its position within the chute.

The rocking movements of shaft 60 are provided by the movements of an arm 63 carried by the shaft and having its free end provided with a roller 64, the latter extending into the break of bars 34, and being positioned to intersect the path of travel of an advancing body blank. The operation of this arm will be understood from the showing of Fig. 6 in which a body blank is shown as in position beneath the roller, the blank, in advancing to this position having shifted arm 63 from an approximately vertical position—due to the more or less weight action of the arm and roller—to an inclined position as shown in this figure, the roller resting on the upper portion of the blank. In this position, member 57 is in its withdrawn position, leaving the lowermost cover blank of the chute free to drop downwardly out of the chute. When the body blank is advanced from the position shown in Fig. 6, arm 63 will be returned to its normal position as soon as roller 64 passes out of contact with the blank, this action, through the connections referred to, moving lever 58 to permit member 56 to reënter the chute to prevent escape of the succeeding cover blank until arm 63 is again shifted through the advancing movements of a succeeding body blank. By locating arm 63 and roller 64 at the point where the body blank is brought to rest just prior to its being advanced to the manipulating station, the withdrawal movement of member 57 will permit the escape of the particular blank which is to be assembled with the body blank then located in this position, the positioned body and cover blanks advancing toward the point of assembly more or less concurrently. By this arrangement, a steady feed of body blanks will provide a corresponding steady feed of cover blanks. When, however, a body blank fails to manipulate arm 63, bell crank lever 58 will not be moved and release of a cover blank will be prevented.

The point where arm 63 and roller 64 are operative may be considered as a detecting station located in the path of advancing body blanks and operative in the feed of the cover blanks.

The released cover blank passes downward into what may be considered as a variable channel formed by the elements of the clamping and advancing instrumentality, this channel normally being of a size to permit the free downward movement of the cover blank into the channel, after which certain walls of the channel move into clamping relation with respect to the blank, after which the clamped blank is advanced into the assembling position. The channel walls are indicated more particularly in Figs. 5 and 7 to 10.

65 indicates a member yieldably supported in a bracket or support 66, member 65 having a shank extension 65ª extending through the bracket, said extension having a collar 67 within the bracket and between which and the end of a bracket recess is located a spring 68 which tends to maintain member 65 in its advance position. The advance face of member 65 is inclined relative to the longitudinal and transverse directions of the runway, corresponding generally to the major cross-sectional length of the chute. This member is located below the chute (Fig. 5) and forms the rear wall of the variable channel.

The front wall of the variable channel is formed by portions of two elements which are indicated as a lid carrier 69 and a lid closer 70, the general configuration of this portion of these elements being shown more particularly in Figs. 12 and 13, the lid carrier having a tapered advance portion which is provided with a vertically extending anvil face 69ª and with a pair of spaced offsets 71 having forwardly projecting portions 71ª one face of which forms part of the front wall of the variable channel. The remainder of said front wall is provided by projections 70ª, carried by the lid closer and having a face which normally extends in vertical alinement with the inner face of projection 71ª, these faces being inclined to the general direction of length of the lid carrier and lid closer by reason of the fact that these elements reciprocate in the direction of their length and the positioned cover blank has the direction of length of its minor axis inclined to this direction of movement of these elements.

One of the side walls of this channel is provided by a face or anvil 69ª, while the opposite side wall is provided by an element 72 shown more particularly in detail in Fig. 14, this element having a face 72ª which forms the fourth wall of the channel. This element is slidably mounted on lid closer 70, these two elements having a dovetail connection which will permit relative sliding movements of element 72—which may be considered as a clamping element—and the lid closer, these parts being shown as assembled in Fig. 15, element 72 being restrained through the action of springs 73 which tend to retain face 72ª in its clamping position, the location of this face in this position however being normally prevented by the contact of a projection 72ᵇ on element 72 with a stop 74 carried by the frame of the machine, the co-action of member 72ᵇ and the stop being shown in Fig. 7.

As shown in said Fig. 7, face 69ª is normally spaced a suitable distance from the side of the blank, the latter moving to this position in the variable channel through the action of the lower end of the chute. Similarly, face 72ª is normally spaced from the opposite side face of the blank, so that the channel so formed is of larger dimensions than the cross-section of the blank, with the result that the latter will readily pass to position, coming to rest, when released from the chute, on a support 75 (Fig. 10).

Clamping of the cover blank and advance of the clamped blank is provided by the advancing movements of the lid carrier and lid closer, the normal or inactive position of these elements being shown in Fig. 7. These elements advance in unison during the clamping and cover advancing movements, the advancing movement of the lid carrier and lid closer bringing face 69ª into contact with one side of the cover blank, this advance also acting to provide sufficient movement between member 72 and the lid closer to cause face 72ª to contact with the opposite side of the cover blank, the spring mounting of member 72 causing the blank to be clamped between faces 72ª and 69ª. During the succeeding advance of the clamped blank, a tapered face 69ª of the lid carrier contacts with the face of member 65, forcing said member rearwardly and out of the path of travel of the clamped blank. This advance movement of the lid carrier and lid closer continues, and since the parts are so positioned that the hook ears of the cover blank are brought to the body blank in registration with the openings of the latter through which the hooks are to pass, this advancing movement causes the two parts to be assembled by hooking the cover ears beneath the pintle of the body blank. As the lid carrier clamping face is in the form of an anvil, the movement of the cover blank to this position concurrently places an anvil structure in proper position for the hook clenching operation which is provided by the clencher tool continuing its advance movement to turn the projecting ends of the hooks about the pintle. This position completes the advancing movement of the lid carrier without, however, stopping the advancing movement of the lid closer which continues to advance from the position shown in Fig. 8 and brings a shoulder $70^b$ into contact with the cover, the result being that further advance movement causes the cover to be moved on its hinge to its closed position, Fig. 9 indicating the position of parts as the cover is approaching such closed position. During this closing movement, the clencher tool is withdrawn to permit closing, and since the clamping or gripping action on the cover is by the action of springs 73, it will be understood that the positive pressure provided by shoulder $70^b$ will release the cover from its engagement with face $72^a$, element 72 yielding sufficiently to permit this action.

Upon completion of the lid closing action the clamping and advancing instrumentality—which, in the embodiment shown, includes the lid closer—is retracted, leaving the runway free for the advance of the assembled structure, the body clamping mechanism being released prior to such advancing movements.

The lid carrier and lid closer movements are controlled by the operations of two cams or cam faces 75 and 76, cam 75 controlling the operations of the lid carrier and cam 76 the operations of the lid closer. The lid carrier is operatively connected to its cam by means of a bell crank lever 77, one arm of which is adjustably connected to the shank of the lid carrier, its opposite arm carrying a roller operative in the cam groove $75^a$ of cam 75. The lid closer is operatively connected to cam 76 by a pivoted bell crank lever 78, one arm of which is connected to the shank of the lid closer, the other arm carrying a roller operative in connection with the cam groove $76^a$ of cam 76.

Figure 3:
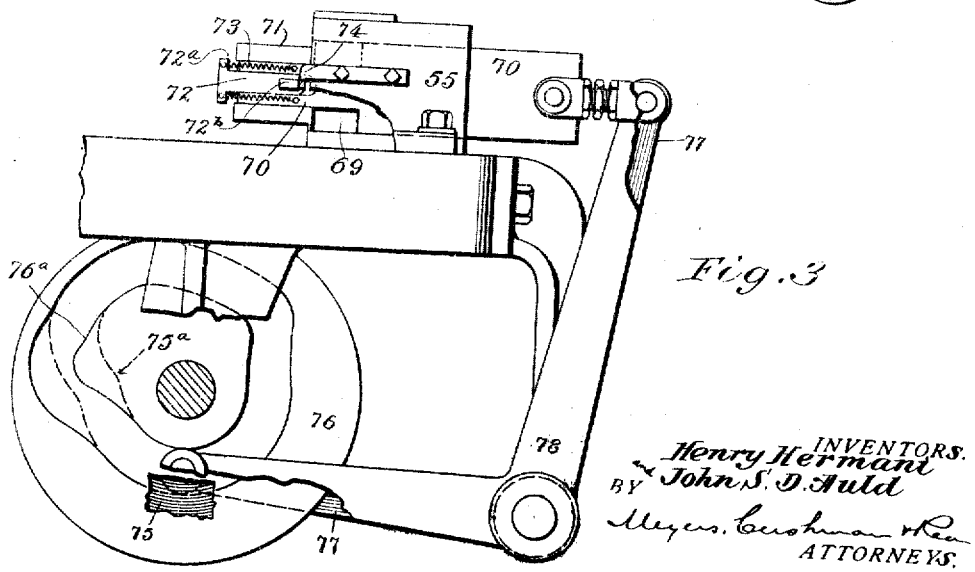
Fig. 3 is a view of parts shown in Fig. 2 with other portions broken away to show hidden operating parts.

As will be seen from Fig. 3, cams 75 and 76 differ from each other as to groove contour in a portion only of the cam grooves, this difference providing the different operations of the lid carrier and lid closer securing upon the completion of the clenching operation, the lid carrier dwelling for a time and then returning to normal position, while the lid closer continues its advance and then returns to its normal position, element 72 traveling in unison with the lid closer excepting during the periods when projection $72^b$ is in contact with stop 74.

The several mechanisms may be timed for operation to meet individual conditions, the arrangement of parts disclosed in the drawings being such that the beginning of the lid carrier and lid closer movements takes place shortly in advance of the beginning of the advance movement of the clencher tool, the lid carrier and lid closer moving to cover-gripping position and advancing the cover blank while the clencher tool and body blank are advancing, the clencher tool dwelling slightly as heretofore indicated, and then continuing its advance movement, the body blank being clamped to position intermediate the time when the advance of the body blank is stopped in proximity to or by the tool and the time when the advance of the cover blank brings its hooks into position to enter the body blank. If desired, the timing arrangement may be such that a slight cover closing movement may be had in advance of movement of the clencher tool away from clenching position, thus tending to more completely close the hook ears, the clencher tool being withdrawn before the cover reaches a position where it might grip or bite on the tool.

Obviously, this particular timing may be varied as desired, the general arrangement shown, however, being such that it is possible to provide movements of parts in overlapping relation and without interference, thus permitting the completion of the operation to take place within a minimum space of time.

From the above it will be understood that the advancing movement of the body blank is with its major axis extending in a vertical plane, thus providing a minimum supporting contact with the curved side of the blank, thereby tending to reduce the liability of defacing the front or rear walls of the body portion which generally contain advertising matter, the general practice being to provide the finished surface to the blank while in sheet form and prior to its being formed into the body blank shown. While this blank is clamped in position during the assembling operation, no movement of the body blank takes place during this period in which it is clamped, so that substantially no liability of defacing the exposed surface of the blank is had by the clamping action, it being understood, of course, that the clamping mechanism of the body blank is released prior to the succeeding advance of the body blank.

It will also be understood that the major axis of the cover also extends vertically, and that the advancing movement of the cover is in a direction transverse to the major axes of both cover and body blanks. In other words, the direction of movement of the cover in advancing from its fed position to its assembly position is substantially transverse to the direction of travel of the body blank, all movements of the cover blank after reaching a point where interference with the body blank is possible taking place while the body blank is stationary and held in clamped position, thus placing the openings into which cover blank hooks are to pass at a definite point and maintained at such point during the entrance of the hooks and the succeeding clenching operation.

In this connection, it may be noted that accuracy in the advancing of the body blank into the operating station is not material, as long as such advance is sufficient to provide contact with the rear face of the clencher tool at the time when the body blank reaches its clamped position. Should the advance of the blank not bring it into contact with the tool or have advanced it at a comparatively rapid speed and caused a slight rebound, such action is immaterial, due to the fact that the face of the tool inclines both to the longitudinal and transverse directions of the runway, so that when the blank is shifted laterally, it will be brought into contact with this face and will be carried to the proper point. This more or less flexibility in delivery of the body blank into the operating station is of advantage in providing apparatus operations of comparatively large capacity, since the advancing mechanism may move with considerable speed without tending to affect the position of the body blank in the assembling operation. And since both blanks are clamped at least to the time of approximate completion of the clenching operation, the operating parts in the manipulating station may also operate at high speed, the body blank remaining clamped until the cover is closed, clamping of the cover not being required after it has been assembled and its hooks clenched.

As will be seen, the body blank is advanced with an open end foremost, this end being that to which the cover is to be applied. Since the body blanks are more or less tubular in cross-sectional contour— whether the cover is applied before or after the bottom is placed in position—the advance of the body blank with its open end foremost enables the use of more compact form of mechanism and provides for minimum contact of the apparatus with the blank during the advancing movement, thus tending to materially reduce liability of defacing the blank. Inasmuch as the blank is advanced in this manner and in practically a single plane from the time it enters into the apparatus until it is discharged therefrom, the cover blank is retained out of such path of travel of the body blank excepting at the time when it is being advanced to assembly position, at which time it is carried substantially transversely across such open end, the clamping and advancing instrumentality for the cover moving in what may be considered as a single plane in carrying the cover blank to this position. This is of advantage in that each type of blank has its advancing movements provided by mechanisms individual to itself, so that each advancing mechanism operates to present its blank at a predetermined point and the delivery of the blank at this point insures absolute registration of the cover blank and body blank, enabling the use of simple and efficient mechanical structures for producing the result. And after the complemental blanks are assembled, the clencher tool is made active and the cover closed. As a result, the complemental blanks have no movements in unison as an assembled or partially assembled structure while the hinge connection is incomplete, the only movements of this type taking place after the hinging operation has been completed, so that there is no liability of displacement of parts or possibility of shifting or disturbance of the relation of one of the complemental blanks to the other after the two blanks have been brought into proximity to each other, all movements of the blanks prior to the completion of the hinging action being as individuals, subsequent movements being those of a completely hinged structure.

While the particular embodiment herein shown and described is adapted to operate in connection with blanks of a more or less oval cross-sectional contour, it will be readily understood that the principles of the invention are not limited to use in this connection, being adapted for use with containers of various other cross-sectional contours by changing the mechanical features in such manner as to accommodate for the changed form of the container. Hence the invention may be employed in connection with curved or angular containers as desired and such general use is contemplated by the invention.

While there is shown and described a preferred embodiment of the invention, it will be readily understood that variations and modifications therein as to general arrangement and mechanical structure of individual instrumentalities may be found necessary or desirable to meet the various exigencies of use to which the invention may be applied, and it is therefore to be understood that reservation is made of the right to make any and all such changes as may be found necessary or desirable in so far as the same may fall within the spirit and scope of the invention as expressed in the accompanying claims when broadly construed.

Having thus described the invention, what is claimed as new, is:

1. In apparatus for assembling formed container body and cover blanks with a hinge connection and in which the body blank configuration is maintained constant during the assembly and hinging operations, a hinging station, means for presenting complemental blanks individually at said station, and means operative in said station for assembling the presented blanks at predetermined relation and for manipulating the positioned cover blank to complete the hinge connection.

2. In apparatus for assembling formed container body and cover blanks with a hinge connection and in which the body blank configuration is maintained constant during the assembly and hinging operations, a hinging station, means for presenting complemental blanks individually at said station, and instrumentalities operative at said station in predetermined operating cycles for assembling the presented blanks in predetermined relation and for manipulating the positioned cover blank to complete the hinge connection.

3. In apparatus for assembling formed container body and cover blanks with a hinge connection and in which the body blanks are of tubular cross-sectional contour and the cover blanks are adapted to overlap the walls of an open end of the body blank, a hinging station, means for presenting complemental blanks individually at such station, and means for assembling presented blanks and for completing the hinge connection thereof by manipulation of the cover blank while the blanks are at said station and while maintaining the body blank configuration constant during the assembly and hinging operations.

4. In apparatus for assembling formed container body and cover blanks with a hinge connection and in which the body blanks are of tubular cross-sectional contour and the cover blanks are adapted to overlap the walls of an open end of the body blank, a hinging station, means for presenting complemental blanks individually at such station, and means for assembling presented blanks and for completing the hinge connection thereof by manipulation of the cover blank while the body blank is positioned at the station and while maintaining the body blank configuration constant during the assembly and hinging operations.

5. In apparatus for assembling formed container body and cover blanks with a hinge connection and for closing the cover and in which the body blanks are of tubular cross-sectional contour and the cover blanks are adapted to overlap the walls of an open end of the body blank, a hinging station, means for positioning a body blank at said station, and mechanism for presenting a cover blank to the positioned body blank in hinging relation and for successively completing the hinging action and closing the cover while the body blank is so positioned.

6. In apparatus for assembling formed container body and cover blanks with a hinge connection and for closing the cover and in which the body blanks are of tubular cross-sectional contour and the cover blanks are adapted to overlap the walls of an open end of the body blank, a hinging station, means for advancing a body blank and a cover blank in intersecting paths to a point of assembly intersection within said station, and instrumentalities operative on the assembled blanks to complete the hinging connection and to close the cover on its hinge axis while maintaining the body blank at the point of intersection.

7. In apparatus for assembling formed container body and cover blanks with a hinge connection and for closing the cover and in which the body blanks are of tubular cross-sectional contour and the cover blanks are adapted to overlap the walls of an open end of the body blank, a hinging station, means for advancing a body blank and a cover blank in intersecting paths to a point of assembly intersection at said station with the body blank located at such point in advance of presentation of the cover blank, and instrumentalities operative on the assembled blanks to complete the hinging connection and to close the cover on its hinge axis while maintaining the body blank at the point of intersection.

8. In apparatus for assembling formed complemental metallic elements with a hinge connection, and wherein one of said elements is formed with pintle-receiving ears extending into the interior of the element, a hinging station, means for advancing elements of one type into said station in predetermined spaced succession, means for maintaining the positioned element against movement at said station during a predetermined period, and means for presenting a complemental element of another type into hinging relation to the positioned element and for completing the hinge connection with the positioned element during such period.

9. In apparatus for assembling formed container body and cover blanks with a hinge connection, a hinging station, means for advancing body blanks to said station in predetermined spaced succession to position each blank therein, said body blank having a preformed hinge configuration, and means for advancing a cover blank having a complemental hinging configuration into assembly relation to the positioned body blank and for completing the hinge connection while both blanks are positioned at said station and while maintaining the body blank configuration constant during the assembly and hinging operations.

10. In apparatus for assembling formed container body and cover blanks with a hinge connection, a hinging station, means for advancing body blanks to said station in predetermined spaced succession to position each blank therein, said body blank having a preformed hinge configuration, and means for advancing a cover blank having a complemental hinging configuration into assembly relation to the positioned body blank and for completing the hinge connection while both blanks are positioned at said station, the advance of the cover blank being in a direction substantially transverse to the direction of advance of the body blank.

11. In apparatus for assembling formed container body and cover blanks with a hinge connection, a hinging station, means for advancing body blanks to said station in predetermined spaced succession to position each blank thereat, said body blank having a preformed hinge configuration, means for positioning a cover blank in proximity to said station and out of the path of travel of an advancing body blank, and means for advancing the positioned cover blank into assembly relation to the positioned body blank and for completing the hinging action while the body blank is so positioned and while maintaining the body blank configuration constant during the assembly and hinging operations.

12. In apparatus for assembling formed container body and cover blanks with a hinge connection and wherein one of said elements is formed with pintle-receiving ears extending into the interior of the element, a hinging station, means for advancing body blanks to said station in predetermined spaced succession to position each blank thereat, said body blank having a preformed hinge configuration, means for advancing the cover blank into assembly relation to the positioned body blank, and means operative on the assembled blanks at said station for completing the hinging action.

13. In apparatus for assembling formed container body and cover blanks with a hinge connection, a hinging station, means for advancing body blanks to said station in predetermined spaced succession to position each blank thereat, said body blank having a preformed hinge configuration, means for advancing the cover blank into assembly relation to the positioned body blank, and means for manipulating the positioned cover blank to complete the hinge connection while both blanks are at said station.

14. In apparatus for assembling formed container body and cover blanks with a hinge connection, a hinging station, means for advancing body blanks to said station in predetermined spaced succession to position each blank thereat, said body blank having a preformed hinge configuration, means for advancing the cover blank into assembly relation to the positioned body blank, and means for providing an internal clenching action on the cover blank to complete the hinge connection while both blanks are at said station.

15. In apparatus for assembling formed container body and cover blanks with a hinge connection and wherein one of said hinge connection and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action.

16. In apparatus for assembling formed container body and cover blanks with a hinge connection, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said latter means including an element adapted to locate the body blank in its clamping position.

17. In apparatus for assembling formed container body and cover blanks with a hinge connection, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said latter means including an element adapted to locate the body blank in its clamping position by the movement of the blank into such clamping position.

18. In apparatus for assembling formed container body and cover blanks with a hinge connection, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means and the hinge-completing means coöperating to locate the body blank in its clamped position.

19. In apparatus for assembling formed container body and cover blanks with a hinge connection, and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means being operative to move the blank transversely from its advancing path.

20. In apparatus for assembling formed container body and cover blanks with a hinge connection, and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means being operative to move the blank transversely from its advancing path after the blank has been advanced to said station and prior to blank assembly.

21. In apparatus for assembling formed container body and cover blanks with a hinge connection, and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means being operative to move the blank transversely from its advancing path after the blank has been advanced to said station and prior to blank assembly, said clamping mechanism maintaining the blank clamped throughout the hinging operation.

22. In apparatus for assembling formed container body and cover blanks with a hinge connection, and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means including a yieldable element for shifting the blank to its clamped position, mechanism for moving said element, and means for controlling the time of activity of said latter mechanism.

23. In apparatus for assembling formed container body and cover blanks with a hinge connection and wherein one of said elements is formed with pintle-receiving ears extending into the interior of the element, a hinging station, means for advancing body blanks to said station in predetermined spaced succession to position each blank thereat, means for clamping the positioned blank, means for advancing a complemental cover blank into assembly relation to the positioned body blank, and means operative on the assembled blanks at said station for completing the hinging action, said clamping means including a reciprocating spring-supported element movable transversely to the path of advance of the blank, a cam, and mechanism between the cam and element operative in the control of element movements.

24. In apparatus for assembling formed container body and cover blanks with a hinge connection, a hinging station, means for advancing body blanks to said station in predetermined spaced succession to position each blank thereat, means for clamping the positioned blank, mechanism movable to position a face in and remove it from the travel path of the advancing body blank, said face being operative to locate the blank in its clamped position, and means for advancing a complemental cover blank to assembly position relative to the positioned body blank.

25. In apparatus for assembling formed container body and cover blanks with a hinge connection, a hinging station, means for advancing body blanks to said station in predetermined spaced succession to position each blank thereat, means for clamping the positioned blank, mechanism movable to position a face in the travel path of the advancing body blank, said face being operative to locate the blank in its clamped position, said mechanism being operative in the hinge-completing action, and means for advancing a complemental cover blank into assembly relation to the positioned body blank and coöperative with said mechanism to complete the hinging action.

26. In apparatus for assembling formed container body and cover blanks with a hinge connection, a hinging station, means for advancing body blanks to said station in predetermined spaced succession to position each blank thereat, means for clamping the positioned blank, mechanism movable to position a face in the travel path of the advancing body blank, said face being operative to locate the blank in its clamped position, said mechanism including a clencher tool, and means for advancing a complemental cover blank into assembly relation to the body blank and coöperative with said tool to complete the hinging action.

27. In apparatus for assembling formed container body and cover blanks with a hinge connection, a hinging station, means for advancing body blanks to said station in predetermined spaced succession to position each blank thereat, means for clamping the positioned blank, a clencher tool adapted to be reciprocated into and out of the path of travel of a body blank, and means for advancing a complemental cover blank into assembly relation with the positioned body blank.

28. In apparatus for assembling formed container body and cover blanks with a hinge connection, a hinging station, means for advancing body blanks to said station in predetermined spaced succession to position each blank thereat, means for clamping the positioned blank, a clencher tool adapted to be reciprocated into and out of the path of travel of a body blank, and means for advancing a complemental cover blank into assembly relation with the positioned body blank, and mechanism for controlling the movements of said tool, said control mechanism being operative to advance the tool into the path of an advancing body blank and to provide clenching action on the assembled blanks.

29. In apparatus for assembling formed container body and cover blanks with a hinge connection, a hinging station, means for advancing body blanks to said station in predetermined spaced succession to position each blank thereat, means for clamping the positioned blank, a clencher tool adapted to be reciprocated into and out of the path of travel of a body blank, and means for advancing a complemental cover blank into assembly relation with the positioned body blank, said clencher tool being movable in a plane inclined to the plane of the path of travel of the advancing body blank.

30. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank in the direction of its length to position it at said station with said open end foremost, and means for presenting a complemental cover blank to and assembling it with said positioned body blank and for completing the hinge connection while said blanks are so positioned and assembled.

31. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank in the direction of its length to position it at said station with said open end foremost, mechanism for presenting a complemental cover blank to and assembling it with said positioned body blank, and means for completing the hinge connection while said blanks are assembled at said station.

32. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover blank and advance it to its assembly position.

33. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover blank and advance it to its assembly position, said instrumentality having opposing faces movable relatively to each other, one of said faces being yieldably supported.

34. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open-end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover blank and advance it to its assembly position, said instrumentality having opposing faces movable relatively to each other, one of said faces forming a support for blanks during the hinging action.

35. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover and advance it to its assembly position, said instrumentality having opposing faces movable relatively to each other, one of said faces being yieldably supported, and means for controlling the relative positions of said faces when the instrumentality is in its cover-receiving position.

36. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover blank and advance it to its assembly position, said instrumentality having opposing faces movable relatively to each other, one of said faces being yieldably supported, and means whereby said face will be held from its clamping position when said instrumentality is in its cover-receiving position and is movable to clamping position by instrumentality movements in the direction of advance of the cover.

37. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a clamping and advancing instrumentality normally positioned to freely receive the cover blank and movable to clamp the received cover blank and advance it to its assembly position, said instrumentality having opposing faces movable relatively to each other, one of said faces being yieldably supported, a tensioning device tending to move one of said faces toward the other to provide a clamping action on the cover blank, and a stop mechanism operative to prevent movement of said face to its clamping position while the instrumentality is in its cover-receiving position.

38. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said hinge-completing means including a clencher tool, said mechanism including a clamping and advancing instrumentality normally positioned to freely receive a cover blank and movable to clamp the received blank and advance it to its assembly position, said instrumentality having opposing faces movable relatively to each other, one of said faces forming an anvil coöperative with said tool in clenching the hinge connection.

39. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a cover blank advancing instrumentality adapted to receive the blank at one side of the path of travel of the body blank and movable to carry the cover blank to assembly position with the body blank.

40. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a cover blank advancing instrumentality adapted to receive the blank at one side of the path of travel of the body blank and movable in substantially a single plane to carry the blank to assembly position with the body blank.

41. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a cover blank advancing instrumentality adapted to receive the blank at one side of the path of travel of the body blank and movable in a direction inclined to the direction of travel of the body blank to carry the cover blank to assembly position.

42. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said mechanism including a cover blank advancing instrumentality adapted to receive the blank at one side of the path of travel of the body blank and movable in a direction inclined to the direction of travel of the body blank and to the plane of the body blank open end to carry the cover blank to assembly position.

43. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said latter means and said mechanism having elements movable in directions inclined to the direction of travel of the body blank.

44. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank to position it at said station with said open end foremost, mechanism for presenting a complemental cover blank to and assembling it with said positioned body blank, and means for completing the hinge connection while said blanks are assembled at said station, said latter means and said mechanism having elements movable in directions inclined to the direction of travel of the body blank and to the plane of the body blank open end.

45. In apparatus for assembling formed container body and cover blanks with a hinge connection and in which the body blanks are of tubular cross-sectional contour and the cover blanks are adapted to overlap the walls of an open end of the body blank, a hinging station, means for advancing a body blank in the direction of its length to and positioning it at said station with its open end foremost and with a major axis of said open end extending in a vertical plane, and means for presenting a complemental cover blank to and assembling it with said positioned body blank and for completing the hinging connection while said blanks are so positioned and assembled.

46. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier having a blank clamping wall, a yieldable element having a blank clamping wall in opposition to the carrier wall, means for normally retaining said walls in position to freely receive a blank and for providing relative movement therebetween to clamp the blank after it has been positioned, and means coöperative with said carrier clamping wall at said station for interlocking the assembled blanks.

47. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel, and means for preventing return movement of a blank being advanced.

48. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel to advance a blank intermittently, and means for retaining the advanced blank against return movement.

49. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel and having blank engaging pawls for advancing a blank intermittently, and means for retaining the advanced blank against return movement.

50. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel and having yieldably-supported blank engaging pawls for advancing a blank intermittently, and means for retaining the advanced blank against return movement.

51. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel and having blank engaging pawls for advancing a blank intermittently, and fixedly-positioned pawls for retaining the advanced blank against return movement.

52. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, a stationary blank support within the runway and having a length to extend through the station, a reciprocating advancing instrumentality operative in said channel and having yieldably-supported blank engaging pawls for advancing a blank intermittently, and yieldably-supported fixedly-positioned pawls for retaining the advanced blank against return movement.

53. In apparatus for assembling formed container body and cover blanks with a hinge connection and in which the body blanks are of tubular cross-sectional contour, a hinging station, mechanism for assembling and hingedly connecting complemental blanks at said station, and means for advancing body blanks in spaced succession to position at said station, the advancing blank having an open end foremost, said means including a runway of channel formation and having a stationary supporting member within the runway for the advancing blank, with the member having a length to extend through said station, a reciprocating element extending parallel with said member and carrying blank-engaging devices operative to advance a blank a predetermined distance during element movements in one direction, and means operative on an advanced blank for retaining it in its advanced position during element movement in the opposite direction.

54. In apparatus for assembling formed container body and cover blanks with a hinge connection, a hinging station, mechanism for assembling and hingedly connecting complemental blanks at said station, and means for advancing body blanks in spaced succession to position at said station, said means including a blank runway of channel formation, said latter mechanism having a blank-receiving formation and being positioned to receive the blank when blank movement from the supply is permitted, a reciprocating advancing instrumentality operative in said channel, and blank-engaging devices in the path of travel of an advancing blank for retaining it in its advanced position during element movements in the opposite direction.

55. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including walls adapted to form a variable channel, a blank supply, said walls being normally positioned to freely receive the blank from the supply, and means for moving said walls to clamp the blank prior to blank presentation at the point of assembly.

56. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier having a blank clamping wall, a yieldable element having a blank clamping wall in opposition to the blank carrier wall, and means for normally retaining said walls in position to freely receive the blank and for providing relative movements therebetween to clamp the blank yieldably after it has been positioned.

57. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier having a blank clamping wall, a yieldable element having a blank clamping wall in opposition to the blank carrier wall, and means for normally retaining said walls in position to freely receive the blank and for providing relative movements therebetween to clamp the blank yieldably after it has been positioned prior to movement of the blank to the point of assembly presentation.

58. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, a yieldable element carrying a third wall of such channel, and means for moving opposing walls of said channel to clamp the received blank in advance of presentation of the blank at the point of assembly.

59. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, independent yieldable elements carrying the remaining walls of the channel, and means for rendering one of said elements and the carrier active to clamp the blank prior to the presentation of the latter at the point of assembly.

60. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, independent yieldable elements carrying the remaining walls of the channel, said carrier being operative to vary the position of one of said yieldable elements during advance of the cover blank to its point of assembly.

61. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, independent yieldable elements carrying the remaining walls of the channel, said carrier being operative to vary the position of one of said yieldable elements during advance of the cover blank to its point of assembly, and means for rendering the other of said elements and the carrier active to clamp the blank prior to the presentation of the latter at a point of assembly.

62. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, independent yieldable elements carrying the remaining walls of the channel, said elements having their directions of yield angular to each other, said carrier being operative to shift the position of one of said elements during blank advance to the point of assembly.

63. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank receiving channel, independent yieldable elements carrying the remaining walls of the channel, said elements having their directions of yield angular to each other, said carrier being operative to shift the position of one of said elements during blank advance to the point of assembly, and means for rendering the other of said elements and the carrier active to clamp the blank prior to the presentation of the latter at the point of assembly.

64. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank-receiving channel, a yieldable element carrying a third wall of the channel and normally positioned to permit free entrance of a blank into said channel, said element being movable both relatively to and with the carrier, and means for advancing the carrier to successively clamp the blank and move it to its point of assembly.

65. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank-receiving channel, a yieldable element carrying a third wall of the channel and normally positioned to permit free entrance of a blank into said channel, said element being movable both relatively to and with the carrier, and means for successively advancing the carrier relatively to said element to clamp the blank and with said element to move the clamped blank to its point of assembly.

66. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank-receiving channel, independent yieldable elements carrying the remaining walls of the channel, one of said elements being movable both relatively to and with said carrier, said carrier being operative to shift the other element during carrier travel, and means for advancing the carrier to provide element shifting, blank clamping and succeeding positioning of the blank at the point of assembly.

67. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier carrying adjacent walls of a blank-receiving channel, independent yieldable elements carrying the remaining walls of the channel, said elements having their movements controlled by the carrier movements, and means whereby the blank will be successively clamped and advanced to the point of assembly.

68. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier having a clamping wall, a support for the element movable with the carrier, and a stop in the path of travel of said element to limit the length of movement of the element.

69. In apparatus for assembling formed complemental metallic blanks in which the blanks have complemental configurations for interengaging connection, an assembly station, mechanism for positioning a blank of one type at said station, and means for presenting a blank of the other type to the positioned blank, said means including a reciprocating carrier having a clamping wall, an element having a clamping wall, a support for said element movable with the carrier, a tension device between the element and its support, and a stop in the path of travel of said element, said stop being positioned to obstruct element movement with the carrier during approach of the latter to one end of reciprocation, said tension device being operative to retain the element in contact with the stop during a predetermined length of carrier movement in the opposite direction.

70. In apparatus for assembling formed container body and cover blanks with an interengaging connection and for closing the cover, an assembly station, means for positioning the body blank at said station, and means for assembling the cover and body blanks and for closing the secured cover blank while the body blank is so positioned.

71. In apparatus for assembling formed container body and cover blanks with an interengaging connection and for closing the cover, an assembly station, mechanism for positioning the body blank at said station, and means for presenting the cover blank to and assembling it with the body blank and for moving the assembled cover to its closed position while the body blank is so positioned.

72. In apparatus for assembling formed container body and cover blanks with an interengaging connection and for closing the cover, an assembly station, mechanism for positioning the body blank at said station, mechanism for assembling the blanks at said station, and means for closing the secured cover blank while the body blank is so positioned.

73. In apparatus for assembling formed container body and cover blanks with an interengaging connection and for closing the cover, an assembly station, mechanism for positioning the body blank at said station, mechanism for presenting the cover blank to and assembling it with the body blank, and means for closing the cover blank while the body blank is so positioned, said means including a closer element movable with the presenting mechanism during presenting movement and independently of said mechanism during the closing movement.

74. In apparatus for assembling formed container body and cover blanks with an interengaging connection and for closing the cover, an assembly station, mechanism for positioning the body blank at said station, mechanism for presenting the cover blank to and assembling it with the body blank, and means for closing the cover blank while the body blank is so positioned, said means including a reciprocating closer element movable with the presenting mechanism during a portion of the reciprocation in one direction and independently of said mechanism during the remainder of the reciprocation.

75. In apparatus for assembling formed container body and cover blanks with an interengaging connection and for closing the cover, an assembly station, mechanism for positioning the body blank at said station, mechanism for presenting a cover blank to the positioned body blank for assembly and including a reciprocating carrier having a blank-clamping wall, and means for closing the assembled cover, said means including a reciprocating closer carrying an element coöperating with the carrier wall to clamp the cover blank during the blank presenting movement.

76. In apparatus for assembling formed container body and cover blanks with an interengaging connection and for closing the cover, an assembly station, mechanism for positioning the body blank at said station, mechanism for presenting a cover blank to the positioned body blank for assembly and including a reciprocating carrier having a blank-clamping wall, and means for closing the assembled cover, said means including a reciprocating closer carrying a yieldable element coöperating with the carrier wall to clamp the cover blank during the blank presenting movement, said element being movable relatively to the closer to produce clamping action and in unison with the closer during the blank presenting movement.

77. In apparatus for assembling formed container body and cover blanks with an interengaging connection and for closing the cover, an assembly station, mechanism for positioning the body blank at said station, mechanism for presenting a cover blank to the positioned body blank for assembly and including a reciprocating carrier having a blank-clamping wall, and means for closing the assembled cover, said means including a reciprocating closer carrying an element coöperating with the carrier wall to clamp the cover blank during the blank presenting movement, and means whereby said closer will move in unison with the carrier in a direction to present the blank and will continue movement in such direction independent of the carrier to close the assembled cover.

78. In apparatus for assembling formed container body and cover blanks with an interengaging connection and for closing the cover, an assembly station, mechanism for positioning the body blank at said station, mechanism for presenting a cover blank to the positioned body blank for assembly and including a reciprocating carrier having a blank-clamping wall, and means for closing the assembled cover, said means including a reciprocating closer carrying an element coöperating with the carrier wall to clamp the cover blank during the blank presenting movement, and means whereby said closer will move in unison with the carrier in a direction to present the blank and will continue movement in such direction independent of the carrier to close the assembled cover, said element moving with the closer during the blank closing movement.

79. In apparatus for assembling formed container body and cover blanks with an interengaging connection and for closing the cover, an assembly station, mechanism for positioning the body blank at said station, mechanism for presenting a cover blank to the positioned body blank for assembly and including a reciprocating carrier having a blank-clamping wall, and means for closing the assembled cover, said means including a reciprocating closer carrying an element coöperating with the carrier wall to clamp the cover blank during the blank presenting movement, and means whereby said closer will move in unison with the carrier in a direction to present the blank and will continue movement in such direction independent of the carrier to close the assembled cover, said element moving with the closer during the blank closing movement, and having its clamping wall positioned to permit the closing movement of the blank to carry the blank out of the path of travel of said element.

80. In apparatus for assembling formed container body and cover blanks with a hinge connection and for closing the cover, an assembly station, mechanism for positioning the body blank at said station, mechanism for presenting a cover blank to the positioned body blank and including a reciprocating carrier and a yieldable element adapted to provide clamping walls for the cover blank, mechanism operative at said station for completing hinge connection on the assembled blanks, and means for closing the cover after it has been hinged, said means including a reciprocating closer having a shoulder, said closer being movable in unison with the carrier during blank-presenting movements and independent of the carrier during cover-closing movements, said shoulder being maintained out of contact with the blank prior to the hinging operation, succeeding movement of the closer causing contact of shoulder and the blank to produce cover movements on the hinge axis.

81. In apparatus for assembling formed container body and cover blanks with a hinge connection, a hinging station, mechanism for advancing the body blank to position at said station, a cover-blank supply adapted to deliver blanks, mechanism for advancing a complemental cover blank to the positioned blank, said latter mechanism having a blank-receiving formation and being positioned to receive the blank when blank movement from the supply is permitted, and a single means for both feeding the cover blank to the advancing mechanism and preventing delivery of a cover blank in the absence of a body blank at the station.

82. In apparatus for assembling formed container body and cover blanks with a hinge connection, a hinging station, mechanism for advancing the body blank to position at said station, a cover-blank supply adapted to deliver blanks, mechanism for advancing a complemental cover blank to the positioned blank, said latter mechanism having a blank-receiving formation and being positioned to receive the blank when blank movement from the supply is permitted, mechanism for admitting blanks to the cover-blank advancing mechanism individually, and means for controlling the blank admitting mechanism to prevent blank admittance in the absence of a body blank at such station.

83. In apparatus for assembling formed container body and cover blanks with a hinge connection, a hinging station, mechanism for advancing the body blank to position at said station, a cover-blank supply adapted to deliver blanks, mechanism for advancing a complemental cover blank to the positioned blank, said latter mechanism having a blank-receiving formation and being positioned to receive the blank when blank movement from the supply is permitted, mechanism for admitting blanks to the cover-blank advancing mechanism individually, and means for controlling the blank admitting mechanism to prevent blank admittance in the absence of a body blank at such station, said means being controlled by the presence or absence of a body blank in the blank advancing mechanism.

84. In apparatus for assembling formed container body and cover blanks with a hinge connection, a hinging station, mechanism for advancing the body blank by stages to position at said station, a cover-blank supply adapted to deliver blanks, mechanism for advancing a complemental cover-blank to the positioned body blank for blank assembly, said latter mechanism having a blank-receiving formation and being positioned to receive the blank when blank movement from the supply is permitted, and means controlled by the body blank travel through the stage in advance of said station for both feeding the cover blank to the advancing mechanism and preventing advance of a cover blank in the absence of a body blank at said stage.

85. In apparatus for assembling formed container body and cover blanks with a hinge connection, a hinging station, mechanism for advancing the body blank by stages to position at said station, a cover-blank supply adapted to deliver blanks, mechanism for advancing a complemental cover blank to the positioned body blank for blank assembly, said latter mechanism having a blank-receiving formation and being positioned to receive the blank when blank movement from the supply is permitted, and means controlled by the body blank travel through the stage in advance of said station for both feeding the cover blank to the advancing mechanism and preventing advance of a cover blank in the absence of a body blank at said stage, said means including an element operative at said stage for detecting the presence or absence of a body blank.

86. In apparatus for assembling formed container body and cover blanks with a hinge connection, a hinging station, mechanism for advancing the body blank to position at said station, a cover-blank supply adapted to deliver blanks, mechanism for advancing a complemental cover blank to the positioned blank, said latter mechanism having a blank-receiving formation and being positioned to receive the blank when blank movement from the supply is permitted, and means for both feeding the cover blank to the advancing mechanism and preventing delivery of a cover blank in the absence of a body blank at the station, said means including a movable element for controlling the admission of blanks to the cover blank advancing mechanism, and detector mechanism operative in the body blank advancing mechanism, and operatively connected to said element to cause cover blank admission solely in the presence of a body blank in coöperative relation with the detector mechanism.

87. In apparatus for assembling formed container body and cover blanks with a hinge connection, a hinging station, mechanism for advancing the body blank to position at said station, a cover-blank supply adapted to deliver blanks, mechanism for advancing a complemental cover blank to the positioned blank, said latter mechanism having a blank-receiving formation and being positioned to receive the blank when blank movement from the supply is permitted, and means for both feeding the cover blank to the advancing mechanism and preventing delivery of a cover blank in the absence of a body blank at the station, said means including a movable element for controlling the admission of blanks to the cover blank advancing mechanism and normally positioned to prevent cover blank admission, detector mechanism operative in the body blank advancing mechanism, and connections between the element and detector mechanism operative to shift said element out of its normal position to admit a cover blank solely in the presence of a body blank in coöperative relation with the detector mechanism.

In testimony whereof we have hereunto set our hands.

HENRY HERMANI.
JOHN S. D. AULD.